(12) United States Patent
Huynh et al.

(10) Patent No.: US 8,891,550 B2
(45) Date of Patent: Nov. 18, 2014

(54) PLATFORM INDEPENDENT CONFIGURATION OF MULTIPLE NETWORK SERVICES

(75) Inventors: Lap T. Huynh, Apex, NC (US);
Dinakaran Joseph, Apex, NC (US);
Linwood H. Overby, Jr., Raleigh, NC (US); Mark T. Wright, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 11/355,023

(22) Filed: Feb. 15, 2006

(65) Prior Publication Data

US 2007/0192447 A1    Aug. 16, 2007

(51) Int. Cl.
*H04J 3/16* (2006.01)
*H04J 3/22* (2006.01)
*H04L 29/06* (2006.01)

(52) U.S. Cl.
CPC ............ *H04L 63/105* (2013.01); *H04L 63/166* (2013.01)
USPC .......................................... 370/466; 370/467

(58) Field of Classification Search
CPC ................................................... H04L 63/105
USPC ........................... 370/464–467; 709/220–222
See application file for complete search history.

(56) References Cited

U.S. PATENT DOCUMENTS

| | | | |
|---|---|---|---|
| 6,996,510 B1* | 2/2006 | Reilly et al. | 703/13 |
| 7,191,229 B2* | 3/2007 | Edmondson | 709/224 |
| 2002/0188701 A1* | 12/2002 | Brown et al. | 709/220 |
| 2003/0028624 A1 | 2/2003 | Hasan et al. | |
| 2003/0110242 A1 | 6/2003 | Brown et al. | |
| 2007/0016937 A1* | 1/2007 | Bassett et al. | 726/1 |
| 2007/0107043 A1* | 5/2007 | Newstadt et al. | 726/2 |
| 2007/0189307 A1* | 8/2007 | Overby et al. | 370/395.52 |

FOREIGN PATENT DOCUMENTS

CN        1556641 A    12/2004

* cited by examiner

*Primary Examiner* — Chuong T Ho
(74) *Attorney, Agent, or Firm* — Steven M. Greenberg, Esq.; CRGO Law

(57) ABSTRACT

Embodiments of the present invention address deficiencies of the art in respect to network services protocol implementation configuration and provide a method, system and computer program product for platform independent configuration of multiple network services protocol implementations. In one embodiment of the invention, a method for configuring a network services protocol implementation can include configuring a platform independent configuration for a network services protocol implementation. Thereafter, a target node can be selected to receive a deployment of the network services protocol implementation and the configured platform independent configuration can be transformed into a platform specific configuration for the target node. Finally, the transformed platform specific configuration can be deployed onto the target node.

4 Claims, 2 Drawing Sheets

PLATFORM INDEPENDENT CONFIGURATION OF MULTIPLE NETWORK SERVICES

BACKGROUND OF THE INVENTION

1. Field of the Invention

The present invention relates to computer internetworking and more particularly to the field of network configuration according to disparate network communications protocols.

2. Description of the Related Art

Computing devices alone have proven to be useful tools to billions globally; however, the interconnection of computing devices in computing networks has provided a level of utility orders of magnitude in excess of the stand alone computing device. The basic computer network has been uniformly enabled through the implementation of the transport control protocol/internet protocol (TCP/IP). Conforming implementations of TCP/IP form the very heart of the global Internet across which trillions of packets of information flow each day.

Modern advances in computer internetworking rely upon a multiplicity of highly complex protocols, each serving a particular purpose. Substantially attention has been paid recently to security protocol implementations that provide a high level of secure network communications. Security protocol implementations generally include mechanisms for authenticating the identity of communicants to a session and the negotiation of encryption keys for securing data transmitted therebetween. Security protocol implementations further provide means for exchanging encrypted data and for decrypting the data when required. Finally, security protocol implementations often provide infrastructure and processes enabled to pass secure data deep into a secure network without compromising or exposing the identity of one or both of the communicants to outside parties. Examples include Internet Security Protocol (IPSec) tunneling and transport layer security (TLS).

Security protocol implementations, like the implementation of many other network services protocols, often originate from a uniformly adopted protocol. In many cases, the uniformly adopted protocol persists in the form of an industry standard. Notwithstanding, implementations of uniformly adopted protocols can vary for different platforms such that users in many cases must recognize the implementation details of each implementation.

Given the varying implementations of different network services protocols, configuring a computer network for interoperability across multiple different computing platforms utilizing one or more common network services can be challenging. In particular, to the extent that different protocol implementations can exist for the same common network service protocol for different platforms, a systems integrator must maintain a high degree of familiarity with different implementations. Additionally, the tools provided to configure an implementation of a network services protocol can vary from implementation to implementation.

For single network services protocol, maintaining a requisite level of familiarity can be reasonable. Yet, for multiple implementations of multiple, different network services protocols, it is not reasonable to expect a suitable level of familiarity when configuring interoperability between different computing nodes in a computing network where each node provides a different platform from a different vendor.

BRIEF SUMMARY OF THE INVENTION

Embodiments of the present invention address deficiencies of the art in respect to network services protocol implementation configuration and provide a novel and non-obvious method, system and computer program product for platform independent configuration of multiple network services protocol implementations. In one embodiment of the invention, a method for configuring a network services protocol implementation can include configuring a platform independent configuration for a network services protocol implementation. Thereafter, a target node can be selected to receive a deployment of the network services protocol implementation and the configured platform independent configuration can be transformed into a platform specific configuration for the target node. Finally, the transformed platform specific configuration can be deployed onto the target node.

Configuring a platform independent configuration for a network services protocol implementation can include establishing a set of connectivity rules for a host system image, associating each of the connectivity rules with a requirement map, and specifying within each of the connectivity rules, local and remote data endpoints. In this regard, the method can include defining the requirement map to specify specific details for Internet protocol (IP) traffic for the network services protocol implementation and security details for the IP network services protocol implementation. The method further can include storing the requirement map in a data store of pre-configured reusable configuration objects for use by other connectivity rules and by other host system images.

Defining the requirement map to specify specific details for IP traffic for the network services protocol implementation and security details for the IP the network services protocol implementation can include defining the requirement map to specify a multiple traffic descriptors each corresponding to a security level. Moreover, storing the requirement map in a data store of pre-configured reusable configuration objects for use by other connectivity rules and by other host system images, further can include storing each of the traffic descriptors and corresponding security levels as reusable configuration objects in the data store of pre-configured reusable configuration objects for use by other requirement maps.

In another embodiment of the invention, a data processing system for configuring a network services protocol implementation can include a development tool, a platform independent configuration builder, a platform specific configuration builder, and a data store of pre-configured reusable configuration objects usable by the platform independent configuration builder. The platform independent configuration builder can include program code enabled to generate a platform independent configuration for a network services protocol implementation, whereas the platform specific configuration builder can include program code enabled to transform the platform independent configuration for the network services protocol implementation into a platform specific configuration for a selected target node.

The platform independent configuration for a network services protocol implementation can include a host system image and one or more connectivity rules disposed in the host system image, each of the connectivity rules specifying a pair of IP endpoint addresses and a requirement map for communications between the pair of IP endpoint addresses. Notably, the data store of pre-configured reusable configuration objects can include objects usable by the platform independent configuration builder to generate the platform independent configuration for the network services protocol implementation.

In this regard, the data store of pre-configured reusable configuration objects can include traffic descriptors, security levels and requirement maps. Each of the requirement maps can associate at least one of the traffic descriptors with a corresponding to one of the security levels. Alternatively, each of the requirement maps can associate at least one of traffic descriptors with multiple ones of the security levels. In that case, the method also can include generating a filter rule permitting traffic selected for protection by one of the security levels. Furthermore, the method can include detecting an inherent conflict between two selected security levels for a traffic descriptor, and posting a warning and guidance for curing the inherent conflict. Finally, the requirement maps can associate a traffic descriptor not only with a corresponding security level, but also a quality of service (QoS) level. As such, traffic associated with the traffic descriptor can enjoy the specified QoS level once encrypted to meet the corresponding security level.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for a platform independent configuration of multiple network services protocol implementations. In one embodiment of the invention, a platform independent configuration for a network services protocol implementation can be generated without regard to any particular target platform or node. Thereafter, a target node can be selected to receive a deployment of the network services protocol implementation. Consequently, the platform independent configuration can be transformed into a platform specific configuration for the target node, and the transformed platform specific configuration can be deployed onto the target node.

To support the configuration and transformation of a platform independent configuration of a network services protocol implementation into a platform specific configuration of the network services protocol, a core set of reusable components can be defined for the platform independent configuration. The reusable components can include a set of requirement maps, each requirement map associating at least one traffic descriptor with a corresponding security level. The traffic descriptor can include the specific requirements for network traffic for the network services protocol, while each security level can indicate the security technology and corresponding parameters for use in communicating according to the network services protocol.

Utilizing the reusable components, one or more connectivity rules can be provided for a stack within a host system image. Each connectivity rule can specify local and remote data endpoints and each connectivity rule can reference one of the requirement maps. An administrator can configure the stack for a host system image with one or more of the connectivity rules, irrespective of the nature of the target platform. Thereafter, the host system image can be transformed into a platform specific configuration for each of the connectivity rules based upon a selected target node into which the host system image is to be deployed.

Figure 1:
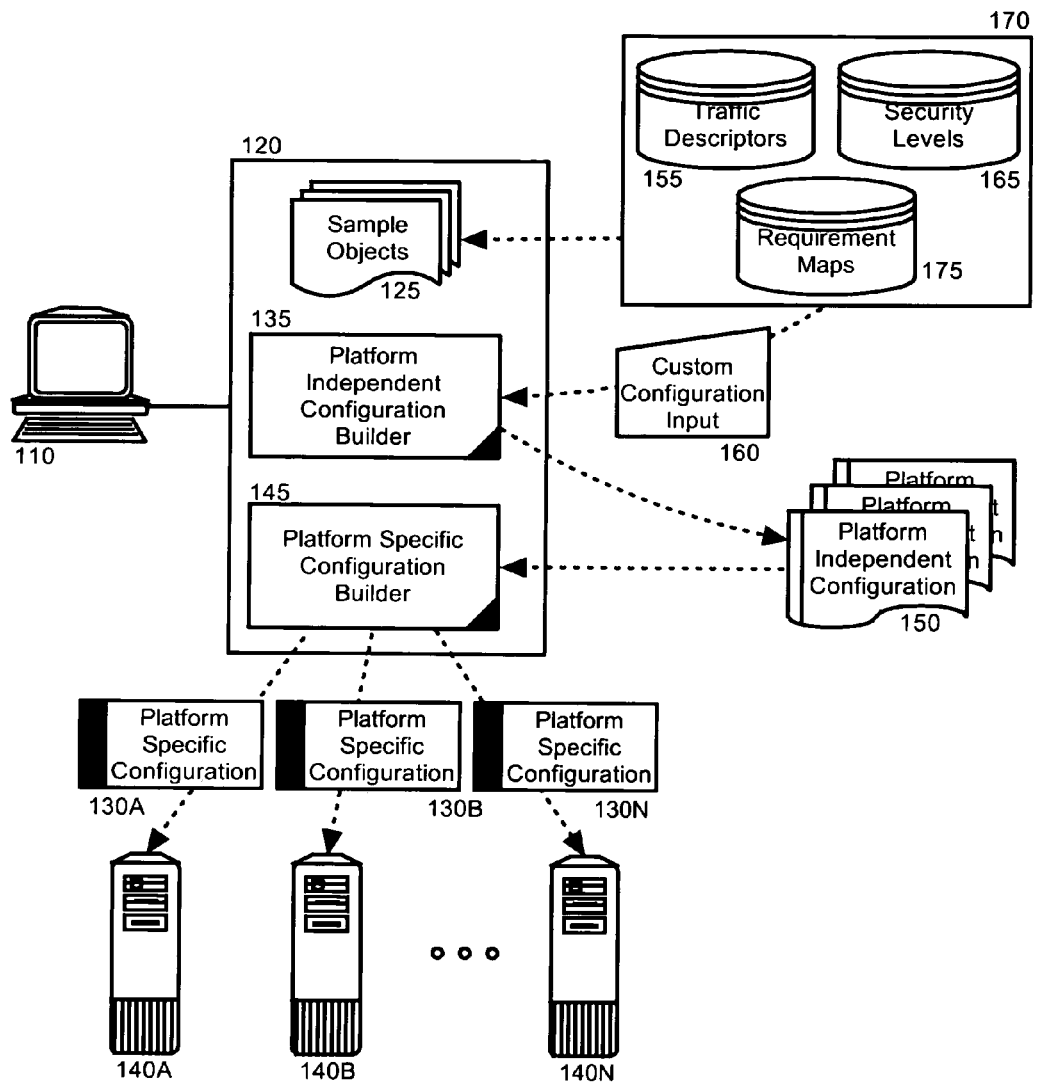
FIG. 1 is a schematic illustration of a data processing system configured for the platform independent configuration of multiple network services protocol implementations.

In more particular illustration, FIG. 1 is a schematic illustration of a data processing system configured for the platform independent configuration of multiple network services protocol implementations. As used herein, network services protocol implementations can include programmatic implementations of network services including security services such as IPSec and TLS, as well as non-security services such as quality of service (QoS) management systems. As shown in FIG. 1, the data processing system can include an administrator workstation 110 coupled to a development tool 120. The development tool 120 can include a platform independent configuration builder 135 and a platform specific configuration builder 145. Additionally, the development tool 120 can include one or more pre-configured sample objects 125—namely one or more pre-configured connectivity rules.

The platform independent configuration builder 135 can include program code enabled to define one or more connectivity rules based upon customized configuration input 160. The customized configuration input 160 can include one or more requirement maps 175, each of the requirement maps 175 associating one or more traffic descriptors 155 with corresponding security levels 165. The traffic descriptors 155 can be uniquely named and can contain the specific details of IP traffic such as the protocol type, local port identity and remote port identity. The security levels 165, in turn, can indicate a security technology such as IPSec or TLS and other security details such as crypto graphic cipher details.

Each of the requirement maps 175 can map at least one of the traffic descriptors 155 to a corresponding one of the security levels 165 in order to represent a repeatable connectivity pattern. In this way, the requirement maps 175 can be reusable configuration objects and can be used by multiple connectivity rules. As such, generally, the requirement maps 175, traffic descriptors 155 and security levels 165 can be stored in a data store of pre-configured reusable configuration objects 170. In this way, once configured, the requirement maps 175, traffic descriptors 155 and security levels 165 stored in the data store of pre-configured reusable configuration objects 170 can be reused as customized configuration input 160 in generating a platform independent configuration 150 for a network services protocol implementation.

The platform specific configuration builder 145 can include program code enabled to transform a platform independent configuration 150 for a network services protocol implementation into a platform specific configuration 130A, 130B, 130N for corresponding target nodes 140A, 140B, 140N in a computer communications network. In this regard, the program code of the platform specific configuration builder 145 can process the platform independent directives of the requirement maps 175, traffic descriptors 155 and security levels 165 in order to produce platform specific directives for a selected one of the target nodes 140A, 140B, 140N. Subsequently, the platform specific configurations 130A, 130B, 130N can be deployed to the target nodes 140A, 140B, 140N.

Figure 2:
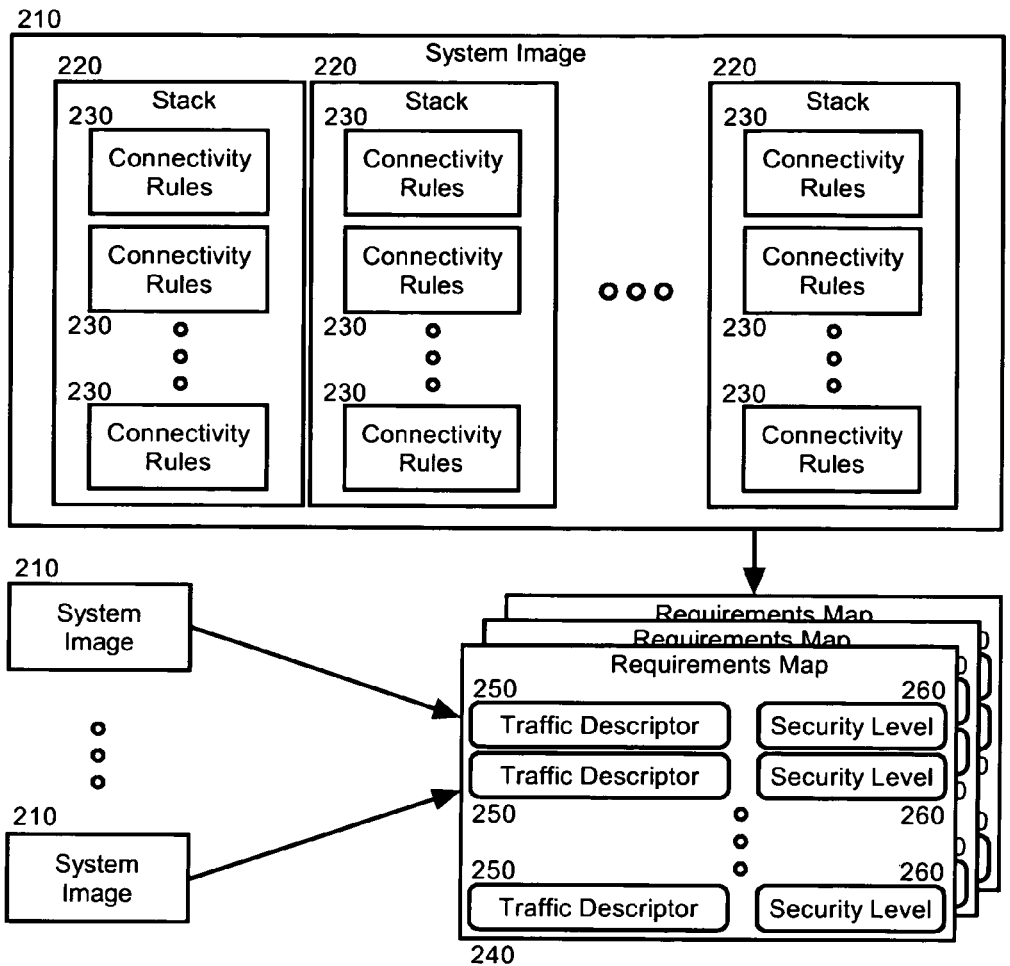
FIG. 2 is a block diagram of a set of system images each enabled to access different requirement maps through corresponding network protocol stacks for a platform specific configuration for a network services protocol implementation in the data processing system of FIG. 1; and, FIG. 3 is a flow chart illustrating a process for deploying a platform specific configuration for a network services protocol implementation from a platform independent configuration of a network services protocol implementation.

In further illustration, FIG. 2 is a block diagram of a set of system images with each stack enabled to access different requirement maps for a platform specific configuration for a network services protocol implementation in the data processing system of FIG. 1. Each system image 210 can include one or more protocol stacks 220 and each of the stacks 220 can include one or more connectivity rules 230. Each of the connectivity rules 230 can refer to a requirement map 240 mapping traffic descriptors 250 with corresponding security levels 260. Importantly, each of the requirement maps 240 can be reused by the connectivity rules 230 across multiple different protocol stacks 220 in multiple different host system images 210.

In the present invention, multiple security levels 260 can be specified for a traffic descriptor 250 with a requirement map 240. To avoid conflicts among different security levels 260 for a traffic descriptor 250, however, the platform independent configuration can be configured to account for and resolve inherent conflicts between different security levels 260. In this regard, whenever a security level 260 is specified for a traffic descriptor 250, a filter rule can be generated for the traffic implicated by the traffic descriptor 250 to permit traffic specified for protection by the security level 260. Additionally, whenever a security level 260 is specified for a traffic descriptor 250, other security levels 260 for the traffic descriptor 250 can be identified and compared to the specified security level 260 to warn of any inherent conflicts.

As an example, TLS can be specified as the security level for application level Web traffic over port 80 for unsecured Web traffic and port 443 for secured Web traffic. Responsive to setting TLS as the security level for Web traffic, an IP filter rule can be created permitting traffic on ports 80 and 443. To the extent that an IP filter rule is set to deny traffic on ports 80 and 443, a warning of the inherent conflict can be posted and guidance can be provided in curing the inherent conflict. Likewise, to the extent that IPSec is specified as the security level for Web traffic resulting in the duplicative encryption of the Web traffic, a warning of the inherent conflict can be posted and, as before, guidance can be provided in curing the inherent conflict.

Figure 3:
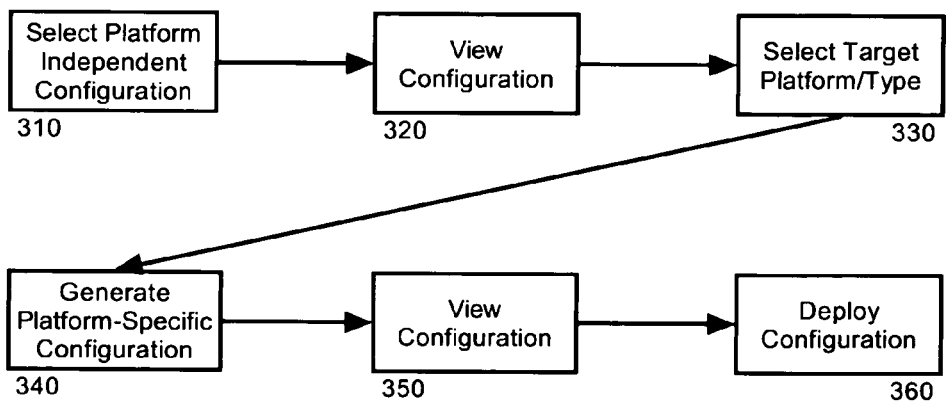

Once a platform independent configuration has been generated for a network service protocol implementation, the platform independent configuration can be transformed into a platform specific configuration for a target node in the computer communications network. Thereafter, the transformed platform specific configuration can be deployed to the target node. In yet further illustration, FIG. 3 is a flow chart illustrating a process for deploying a platform specific configuration for a network services protocol implementation from a platform independent configuration a network services protocol implementation.

Beginning in block 310, a platform independent configuration can be selected for a set of network services protocol implementations. The configuration can include a set of connectivity rules, each connectivity rule indicating remote and local data endpoints in the form of IP addresses, as well as referring to a requirement map. In this regard, the requirement map can indicate all security requirements between the endpoints. Also, to the extent that the data endpoints differ from security endpoints required by a security protocol, the security endpoints can be included in the connectivity rules in addition to the data endpoints.

Once selected, in block 320, the configuration can be viewed within the configuration tool. In block 330, a target platform and corresponding platform type can be selected to receive a deployment of a platform specific transformation of the platform independent configuration. Subsequently, in block 340, a platform specific configuration can be generated for the platform independent configuration in respect to the selected target platform and platform type. Thereafter, in block 350, the platform specific configuration can be viewed within the configuration tool. Finally, in block 360 the platform specific configuration can be deployed to the target platform.

It will be recognized by the skilled artisan that in consequence of the foregoing system and methodology, system administrators can specify requirements for multiple network services for platforms using a single computer program through a single, consistent interface. As such, administrators can focus on the higher level policy requirements for communicating hosts without working with the lower level proprietary platform specific syntax and semantics. In addition to platform independence, the abstract level of configuration of the present invention allows the configuration of multiple network services using the same general object model.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for configuring a network services protocol implementation, the method comprising:
   configuring a platform independent configuration for a network services protocol implementation;
   selecting a target node to receive a deployment of the network services protocol implementation;
   transforming the configured platform independent configuration into a platform specific configuration for the target node; and,
   deploying the transformed platform specific configuration onto the target node, wherein configuring the platform independent configuration for the network services protocol implementation, comprises:
      establishing a set of connectivity rules for a host system image;
      associating each of the connectivity rules with a requirement map;
   specifying within each of the connectivity rules, local and remote data endpoints;
   defining the requirement map to specify specific details for Internet protocol (IP) traffic for the network services protocol implementation and security details for the IP network services protocol implementation; and,
   storing the requirement map in a data store of pre-configured reusable configuration objects for use by other connectivity rules and by other host system images, wherein defining the requirement map to specify specific details for IP traffic for the network services protocol implementation and security details for the IP network services protocol implementation, comprises:
      defining the requirement map to specify a plurality to traffic descriptors each corresponding to a plurality of security levels;
      detecting an inherent conflict between two selected security levels for a traffic descriptor; and,
         posting a warning and guidance for curing the inherent conflict.

2. The method of claim 1, further comprising generating a filter rule permitting traffic selected for protection by one of the security levels.

3. A computer program product comprising a non-transitory computer usable storage medium having stored thereon computer usable program code for configuring a network services protocol implementation, the computer usable program code, when executed by a computer hardware device, causing the computer hardware device to perform:
   configuring a platform independent configuration for a network services protocol implementation;
   selecting a target node to receive a deployment of the network services protocol implementation;
   transforming the configured platform independent configuration into a platform specific configuration for the target node; and,
   deploying the transformed platform specific configuration onto the target node, wherein configuration the platform independent configuration for the network services protocol implementation, comprises:
      establishing a set of connectivity rules for a host system image;
      associating each of the connectivity rules with a requirement map;
   specifying within each of the connectivity rules, local and remote data endpoints;
   defining the requirement map to specify specific details for Internet protocol (IP) traffic for the network services protocol implementation and security details for the IP network services protocol implementation; and
   storing the requirement map in a data store of pre-configured reusable configuration objects for use by other connectivity rules and by other host system images, wherein defining the requirement map to specify specific details for IP traffic for the network services protocol implementation and security details for the IP network services protocol implementation, comprises:
      defining the requirement map to specify a plurality of traffic descriptors each corresponding to a plurality of security levels;
   detecting an inherent conflict between two selected security levels for a traffic descriptor; and
      posting a warning and guidance for curing the inherent conflict.

4. The computer program product of claim 3, further comprising
   generating a filter rule permitting traffic selected for protection by one of the security levels.

* * * * *